United States Patent
Goleman et al.

(10) Patent No.: US 6,192,460 B1
(45) Date of Patent: *Feb. 20, 2001

(54) METHOD AND APPARATUS FOR ACCESSING DATA IN A SHADOW SET AFTER A FAILED DATA OPERATION

(75) Inventors: William Lyle Goleman, Nashua, NH (US); Scott Howard Davis, Groton, MA (US); David William Thiel, Colorado Springs, CO (US)

(73) Assignee: Compaq Computer Corporation, Houston, TX (US)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/991,828

(22) Filed: Dec. 16, 1997

(51) Int. Cl.[7] ..................................................... G06F 11/08
(52) U.S. Cl. ............................... 712/1; 712/32; 712/33; 707/100; 707/201; 707/204
(58) Field of Search .................................. 712/1, 32, 33; 707/100, 201, 204

(56) References Cited

U.S. PATENT DOCUMENTS

| 4,459,658 | * | 7/1984 | Gabbe et al. | 364/200 |
| 4,959,774 | * | 9/1990 | Davis | 364/200 |
| 5,210,865 | | 5/1993 | Davis et al. | 395/575 |
| 5,239,637 | | 8/1993 | Davis et al. | 395/425 |
| 5,333,266 | * | 7/1994 | Boaz et al. | 395/200 |
| 5,454,101 | * | 9/1995 | Mackay et al. | 395/600 |
| 5,546,536 | | 8/1996 | Davis et al. | 395/182 |

OTHER PUBLICATIONS

Davis, S., "Design of VMS Shadowing Phase II—Host–based Shadowing", Digital Technical Journal, vol. 3, No. 3 Summer 1991, pp. 1–9.

* cited by examiner

*Primary Examiner*—Daniel H. Pan
*Assistant Examiner*—Dzung C. Nguyen
(74) *Attorney, Agent, or Firm*—William J. Kubida; Hogan & Hartson LLP (57) ABSTRACT

Disclosed is a method and apparatus for accessing data in a computer system after a failed data operation in which I/O process state information is unknown. The failed data operation may cause data inconsistency among multiple devices associated with a shadow set for storing data. The disclosed system includes techniques for allowing continued data accesses while simultaneously re-establishing data consistency among members of the shadow set.

13 Claims, 8 Drawing Sheets

| | 0 | 1 | 2 | 3 | 4 | 5 | 6 | 7 | 8 | 9 | 10 | |
|---|---|---|---|---|---|---|---|---|---|---|---|---|
| | 0 | 0 | 0 | 0 | 0 | 0 | 0 | 0 | 0 | 0 | 0 | —80a |

INITIALIZED

| | 0 | 1 | 2 | 3 | 4 | 5 | 6 | 7 | 8 | 9 | 10 | |
|---|---|---|---|---|---|---|---|---|---|---|---|---|
| | 0 | 1 | 0 | 0 | 0 | 0 | 0 | 0 | 0 | 1 | 0 | —80b |

AFTER WRITE TO BLOCKS 1 AND 9

| | 0 | 1 | 2 | 3 | 4 | 5 | 6 | 7 | 8 | 9 | 10 | |
|---|---|---|---|---|---|---|---|---|---|---|---|---|
| | 1 | 1 | 0 | 0 | 0 | 0 | 0 | 0 | 0 | 1 | 0 | —80c |

AFTER READ OF BLOCK 0

| | 0 | 1 | 2 | 3 | 4 | 5 | 6 | 7 | 8 | 9 | 10 | |
|---|---|---|---|---|---|---|---|---|---|---|---|---|
| | 1 | 1 | 0 | 0 | 0 | 0 | 0 | 0 | 0 | 1 | 0 | —80d |

AFTER READ BLOCK 1

| | 0 | 1 | 2 | 3 | 4 | 5 | 6 | 7 | 8 | 9 | 10 | |
|---|---|---|---|---|---|---|---|---|---|---|---|---|
| | 0 | 0 | 0 | 0 | 0 | 0 | 0 | 0 | 0 | 0 | 0 | —80e |

REINITIALIZED AFTER FAILED DATA OPERATION

METHOD AND APPARATUS FOR ACCESSING DATA IN A SHADOW SET AFTER A FAILED DATA OPERATION

BACKGROUND OF THE INVENTION

This invention relates generally to performing data operations in a computer system, and more particularly to performing data operations in a computer system after a failed data operation.

As it is known in the art, computer systems typically include one or more devices used for storing data as processed in a computer system. Disk storage is one such typical storage device.

Data stored on devices such as disks may be corrupted or destroyed. Therefore, systems have been developed that create multiple copies of stored data usually on separate storage devices so that if the data on one of the storage devices is damaged, it can easily be recovered from one or more of the other remaining copies. One technique using the multiple copies of data as previously described is commonly known as a shadow set. In a shadow set, data that is stored in a particular block on one member of a shadow set is the same as data stored in a corresponding block on the other one or more members of the shadow set. The process of maintaining multiple members of a shadow set is often referred to as device shadowing or mirroring. Mirroring may be employed when performing a data operation, such as a write operation of data to a disk storage location. A computer system which performs mirroring typically maintains multiple copies of data in which each copy is stored on a separate storage device. Additionally, the members of the shadow set are typically accessed as a single device from which data is read and written.

A computer system may include a plurality of host processors or central processing units (CPUs) which are simultaneously permitted to access the shadow set for read and write data requests (i.e., I/O requests). In such a computer system, the mirroring operation is performed by each CPU in the computer system. Data operations typically performed by a CPU include read and write operations. When one of the CPUs in the computer system wants to write to one of the members of the shadow set, the CPU writes to all members of the shadow set. In other words, when the CPU writes data to the logical device associated with a shadow set, all copies of the data associated with the shadow set and the logical device are updated. When a CPU wants to read data from a logical device associated with a shadow set, the CPU reads data from any member of the shadow set. A CPU performing a read operation from a logical device associated with a shadow set may read from any member of the shadow set due to the multiple copies of the data.

Problems are typically encountered when one of the host computers in the computer system fails to complete a data operation. For example, a host computer may have been performing a write operation to the shadow set and the host computer failed to complete the write operation. In this situation, the host computer has an outstanding write operation. It is a problem for the shadow set in that the data consistency among members of the shadow set is unknown. For example, when performing a write operation, a host computer executing machine instructions writes to all members of the shadow set. If there are three members in the shadow set, the host computer may have performed a write operation to only one member of the shadow set. However, at the time of the failure, the data within a shadow set is not known to be consistent. It is unknown to other host computers in the computer system accessing the shadow set what the state of the data is on the various members of the shadow set devices. For example, subsequent reads from different members of the shadow set may not return consistent (i.e., the same) values. Thus, each host computer in the computer system using the shadow set is affected by this problem of data inconsistency when there is a failed data operation caused by another host computer.

Upon a failed data operation by a host computer in the computer system, other hosts in the computer system typically require continued access to data within the shadow set. In one solution, the host computers may operate in a special mode. In this special mode, write operations continue to be performed, as previously described, such that a write is performed to all members of the shadow set. However, the behavior for a read operation is modified. One existing technique for handling subsequent read operations is the read/write technique in which data is read from any member of the shadow set and then subsequently written to all other members of the shadow set. One drawback with this alternative is the negative impact upon performance in the computer system. In particular, additional write operations are performed for each read operation. Usually, performing a write operation for a shadow set involves performing shadow set member locking operations that require computer resource locking as well as additional computer processing time. Typically, locking operations provide mutually exclusive access to shared resources, such as the shadow set which may be used by multiple hosts. The shadow set locking operations performed by one host blocks data operations of other host systems in order to synchronize access to the shadow set to ensure data consistency within the shadow set. The locking operations are typically accomplished with some interhost communication which is usually expensive due to the associated processing time and resources.

A second alternative technique is a "read, compare and write" technique in which a copy of data is read from any member of the shadow set. The copy read from one member of the shadow set is compared to other data stored on other members of the shadow set at the same location. If there is a data inconsistency among any of the copies of data stored on the various members of the shadow set, a write operation is performed by subsequently writing a copy of the data previously read from one member of the shadow set to other members of the shadow set which differed. This has a benefit of only initiating a shadow set member lock in a write operation when a difference has been detected. However, system performance is still negatively impacted by the compare and write operations. Operations, such as the write operation, are typically costly due to device access times required to perform these operations.

In addition to handling subsequent read and write operations, the shadow set must be returned to a consistent data state. In other words, it is necessary to re-establish the general precondition that multiple copies of the same data exist on members of the shadow set. The foregoing solutions handle data operations subsequent to a host system failure, but do not verify the entire shadow set as having consistent data.

One technique used to re-establish this data consistency among members of the shadow set includes performing a merge operation while simultaneously handling subsequent read and write operations to members of the shadow set. The merge operation is typically performed as a merge process in the computer system executing on one or more host computers in the computer system. One existing technique for performing the merge operation includes sequential verification of each logical component of each member of the shadow set. In other words, if each member of the shadow set is associated with a disk device organized by logical blocks, the merge operation verifies data consistency between each corresponding logical block on each associated disk of the shadow set.

One technique used to perform the data consistency operation is to use the read/write technique previously described for use with subsequent read operations. Using this technique, the merge process simply reads a copy from one member of the shadow set and subsequently locks and writes a copy of this data to other members of the shadow set. Alternatively, the merge process may use the "read, compare and write" technique, as previously described in conjunction with subsequent read operations. Using this technique, the merge process sequentially reads each logical portion of data from one member of the shadow set, and compares the data to other members of the shadow set. Upon detection of a data difference or inconsistency among shadow set members, a copy of the data previously read from the first member of the shadow set is subsequently written to the other members of the shadow set.

As a result, existing techniques used for the merge operation experience the same negative drawbacks and problems as described in conjunction with performing subsequent read operations upon detection of the failure of a host computer in the computer system.

Thus, there is required an efficient technique for performing subsequent data operations and reestablishing data consistency for a shadow set upon detection of a failure of a host computer in a computer system which minimizes performance problems and computer resource problems as those experienced in existing techniques.

SUMMARY OF THE INVENTION

In accordance with principles of the present invention, a method of accessing data in a computer system after a failed data operation includes maintaining a host transaction list used in determining data consistency for data operations subsequent to the failed data operation. The host transaction list is maintained by recording data operations which, when complete, indicate that a storage area associated with each of the data operations contains consistent data.

In accordance with another aspect of the invention, the method employs a merge operation in conjunction with the host transaction list to determine data consistency for a given data operation and additionally reestablish data consistency for the shadow set.

Thus, there is provided an efficient technique for performing data operations in a computer system upon detection of a failure of a host computer in a computer system. Additionally, data consistency is reestablished for a shadow set. The technique provides for minimizing the amount of computer resources and time required to perform subsequent data operations and minimizes the amount of time required to perform a merge operation without negatively impacting system performance.

BRIEF DESCRIPTION OF THE DRAWINGS

The above-mentioned and other features of the invention will now become apparent by reference to the following description taken in connection with the accompanying drawings, in which.

DESCRIPTION OF THE PREFERRED EMBODIMENT

Figure 1:
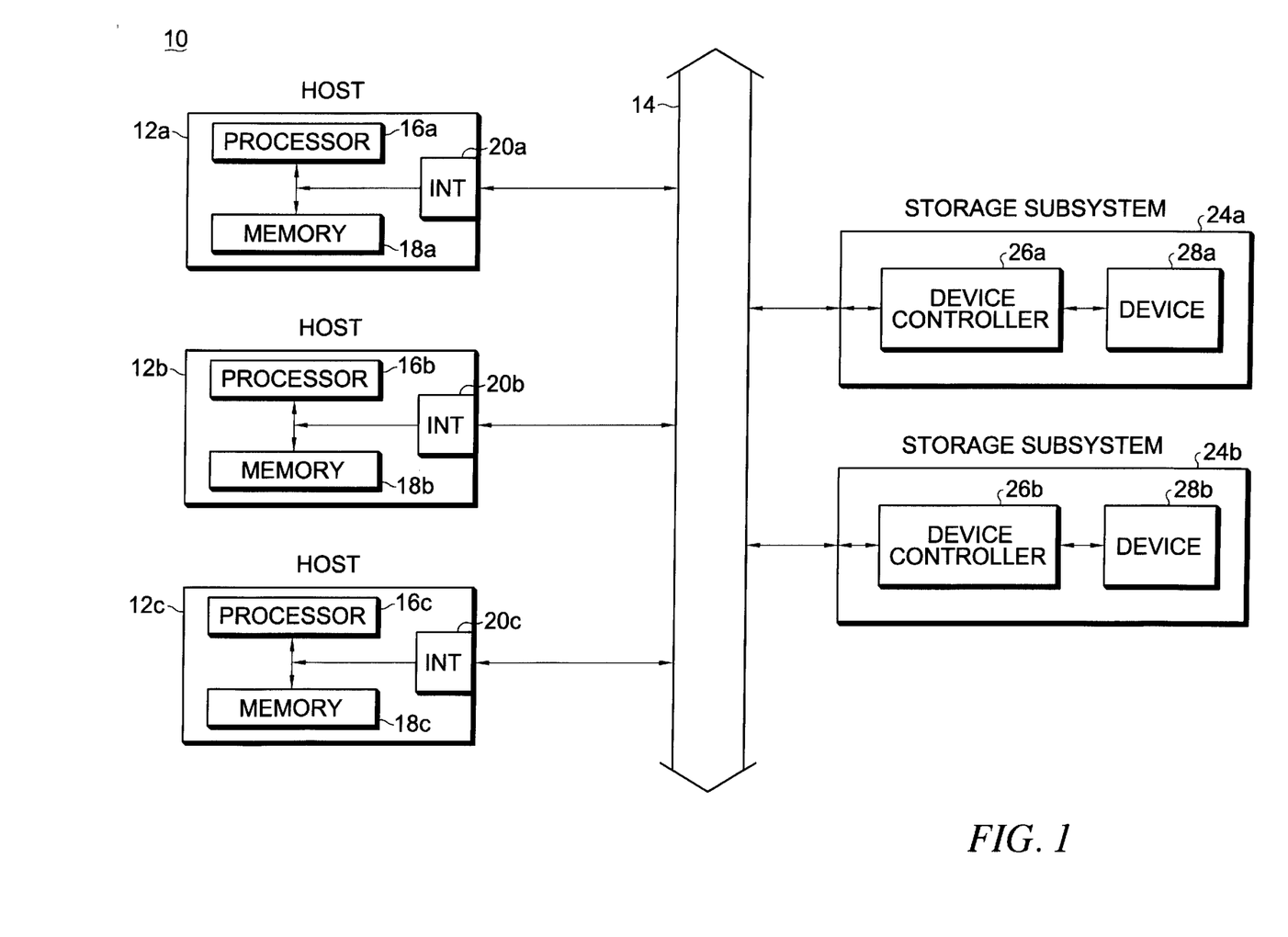
FIG. 1 is a block diagram of a computer system.

Referring now to FIG. 1, an embodiment of the computer system 10 is shown to include a plurality of host computers 12a–12c, a communications medium 14 and storage subsystems 24a–24b. Each host 12a–12c is directly connected through the communications medium 14 to storage subsystems 24a and 24b.

Host computer 12a includes a processor 16a, local memory 18a and communications interface 20a by which host computer 12a is connected to communications medium 14. Similarly, each host 12b–12c include a processor 16b–16c, local memory 18b–18c, and communications interface 20b–20c by which each of hosts 12b and 12c, respectively, is connected to communications medium 14. Each of local memory 18a–18c is used by a corresponding processor, respectively, 16a–16c.

Storage subsystem 24a includes a storage device 28a which is controlled by device controller 26a. Each of the host computers 12a–12c communicate over communications medium 14 with storage subsystems 24a and 24b. Similarly, storage subsystem 24b also includes a device controller 26b and a device 28b. Each of the storage subsystems 24a–24b includes a device, such as a disk, and a corresponding device controller, such as a disk controller, particular for that device stored in the storage subsystem.

In this particular embodiment, members of the shadow set are chosen to include devices in the different storage subsystems 24a–24b. Therefore, a host may directly access each member of the shadow set through its interface such as 20a over communications medium 14 without requiring it to access multiple shadow set members through the same device controller.

Each of the host computer systems 12a–12c typically performs data operations, such as read and write operations, to devices 28a and 28b. In some instances, as will be described in paragraphs below, one of the host computers 12a–12c may initiate a merge operation to achieve data consistency among the data on the two devices 28a and 28b, the members of the shadow set.

The preferred embodiment of FIG. 1 may be characterized as a loosely coupled multi-processor (MP) system without shared memory among the processors or hosts in the computer system 10. Thus, in this preferred embodiment, hosts typically communicate via message passing over the communication medium 14. It should be noted that other embodiments may include varying degrees of shared memory and other techniques to also facilitate interhost communications. This characteristic of the embodiment of FIG. 1 is not to be construed as a limitation.

It should also be noted that in FIG. 1 and the description that follows, a "host" accessing a common set of storage devices is a computer system. However, as known to those skilled in the art, other types of "hosts" may be used in other preferred embodiments incorporating principles of the invention as described herein. For example, in an alternate embodiment incorporating principles of the invention, several storage controllers may be accessing a common set of storage devices included in the shadow set. In this alternate embodiment, the "hosts" are the storage controllers.

Figure 2:
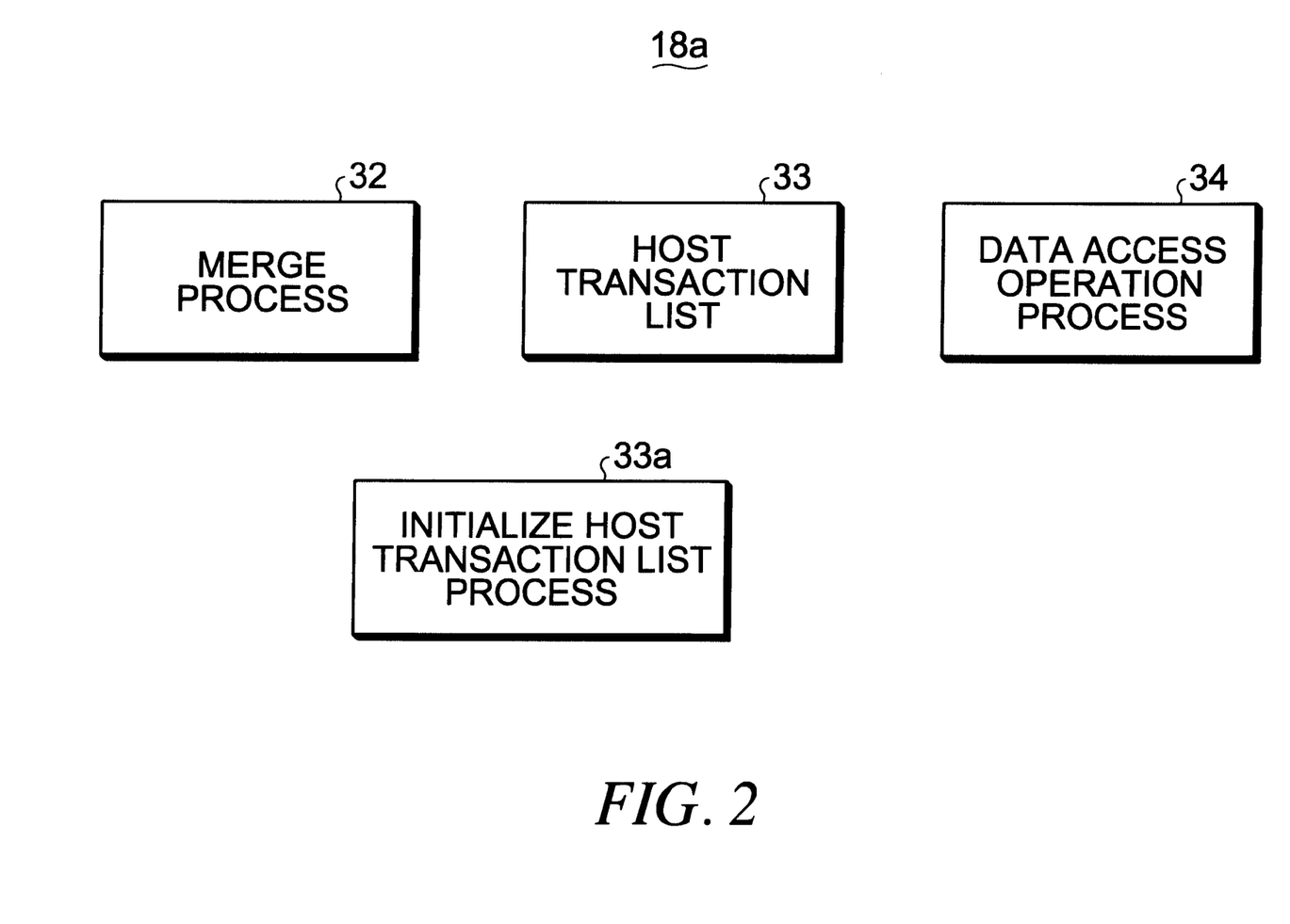
FIG. 2 depicts an embodiment of the contents of a memory of the computer system of FIG. 1.

Referring now to FIG. 2, a block diagram of an embodiment of the contents of local memory 18a of host computer system 12a is shown. Shown in FIG. 2 as contained within memory 18a is a merge process 32, host transaction list 33, data access operation process 34, and initialize host transaction list process 33a. When host computer 12a initiates a merge operation, the merge process 32 is loaded into memory 18a for execution by processor 16a to perform a merge operation. Similarly, when host computer 12a performs a data operation, such as a read or a write, data access operation process 34 is loaded into memory 18a for execution by processor 16a to perform the particular data access operation required. Also, the initialize host transaction list process 33a is initially loaded into memory and similarly executes continuously on a host computer system, as will be described in paragraphs that follow.

The host transaction list 33 generally identifies data operations performed by a host, such as one of 12a–12c, included in a computer system, as in computer system 10 of FIG. 1. Included in the host transaction list are data operations associated with a portion of the shadow set known to be in a consistent data state after completion of the data operations. Typically, one host transaction list is maintained for each host in the computer system. Use of the host transaction list and a more detailed description is included in following paragraphs.

Figure 3A:
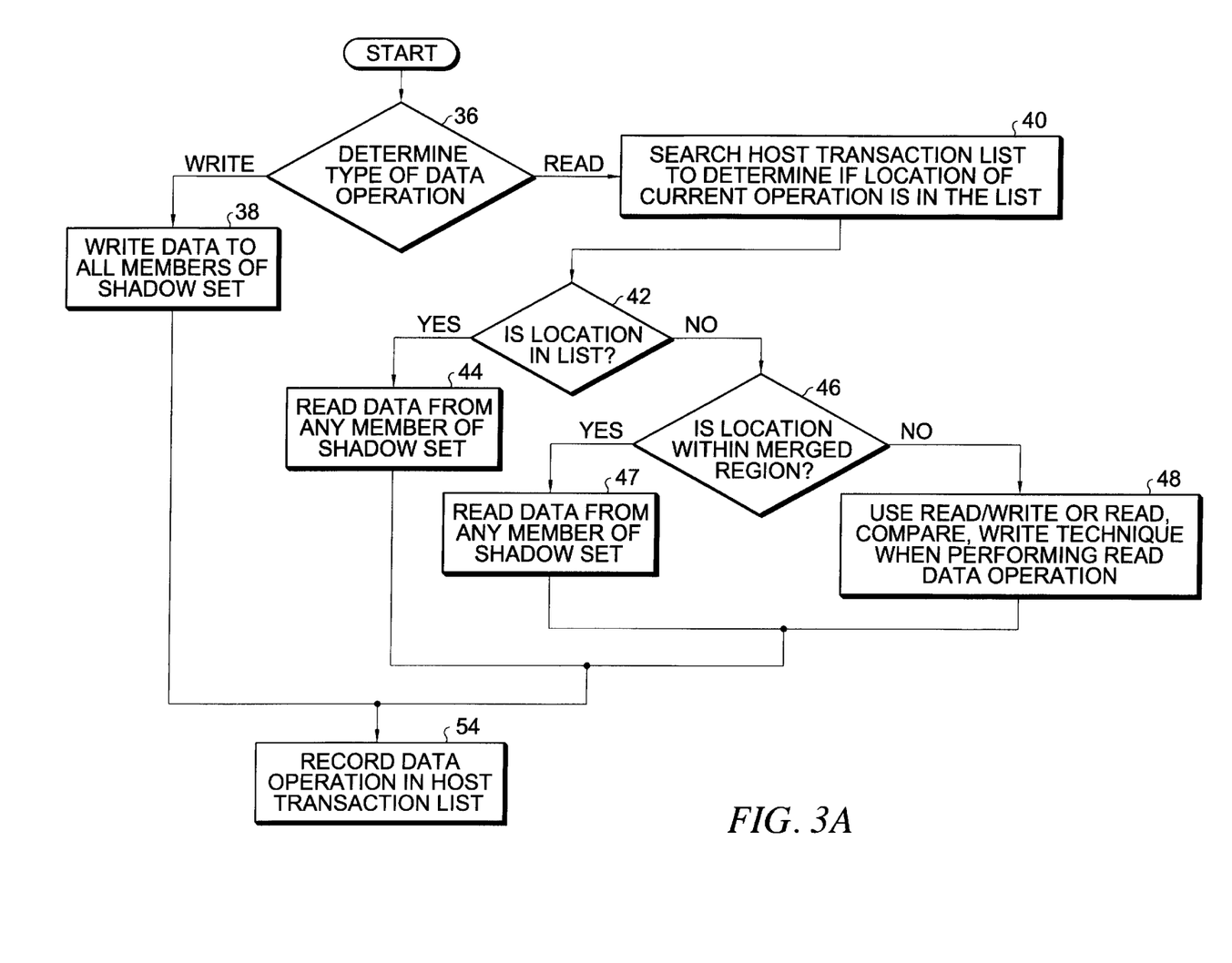
FIG. 3A is a flow chart of an embodiment of a method performing read and write operations upon detection of a failed data operation by a host computer in the computer system.

Referring now to FIG. 3A, a flow chart of an embodiment of a method for performing read and write operations upon detecting that a host computer has failed to complete a data operation is shown. Generally, in paragraphs that follow, the failed data operations may be characterized as data operations with an unknown process state. In other words, the state of data consistency of the shadow set with respect to a particular failed data operation is unknown by any host in the computer system 10.

At step 36 a determination is made as to what type of data operation is to be performed. If a determination is made at step 36 that a write operation is to be performed, control proceeds to step 38 where the data is written to all members of the shadow set. If a determination is made at step 36 that a read operation is being performed, the host computer system searches its transaction list to determine if the location of the current operation from which data is read is in the list. In other words, step 40 is determining if a host computer is reading data from the location to which the host computer has previously performed another data operation.

At step 42 a determination is made as to whether the location of the current data operation matches the location of an item included in the host transaction list. If a determination is made at step 42 that the location corresponds to a member of the host transaction list, control proceeds to step 44 in which data is read from any member of the shadow set. If a determination is made at step 42 that the location of the read operation does not match an element within the host transaction list, control proceeds to step 46 where a determination is made as to whether or not the location is within the merged region of the shadow set. The merged region of the shadow set is that portion of the shadow set upon which the merge operation has been successfully performed indicating that all data locations within the merged region have data consistency among all members of the shadow set.

If a determination is made at step 46 that the location of the current data transaction is within the merged region, control proceeds to step 47 where the data is read from any member of the shadow set. If a determination is made at step 46 that the location is not within the merged data region, an alternate technique, such as the read/write (R/W) or the "read, compare and write" technique is used to perform the read data operation to insure data consistency among members of the shadow set, as at step 48. Note that at step 48, other techniques besides the R/W and "read, compare, and write" techniques may be employed to insure data consistency.

At step 54, information about the current data operation is recorded in the host transaction list. In particular, information which is recorded may include the physical location within a device to which the data operation corresponds. For example, in a read operation from a disk device, the information recorded may include a physical location as indicated by a block number within the disk device from which the read is performed.

Figure 3B:
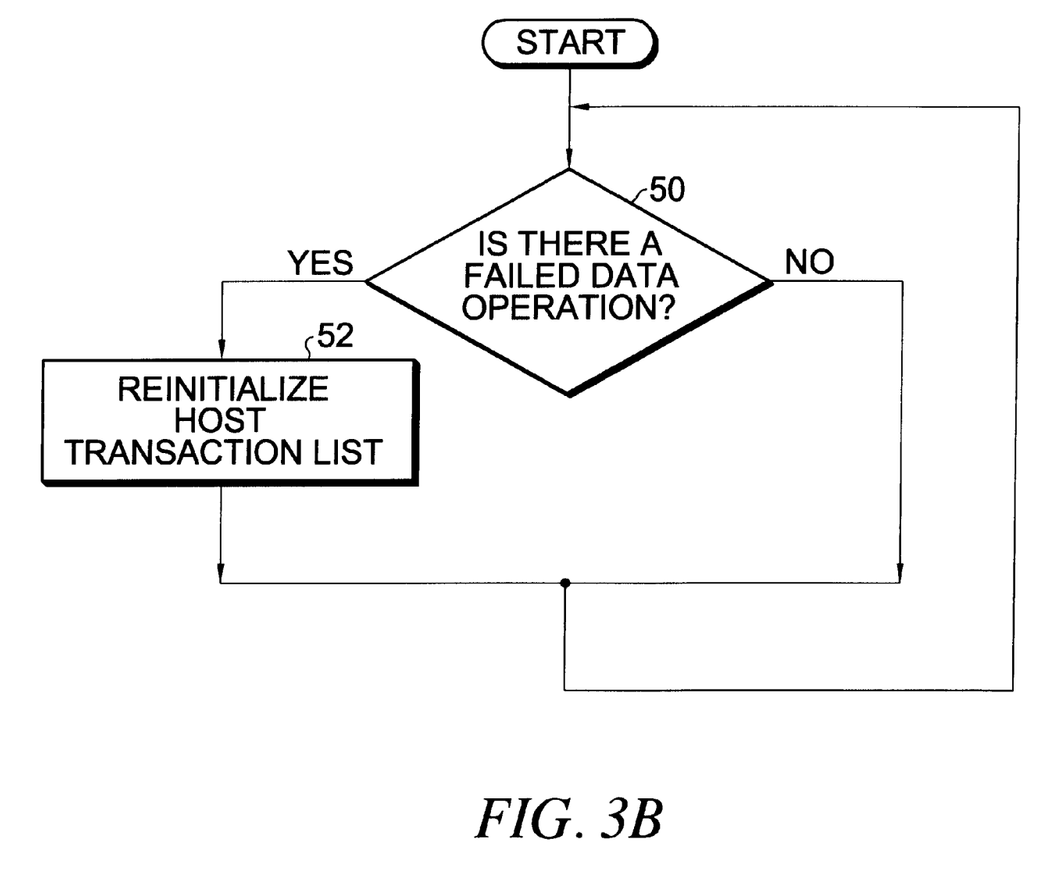
FIG. 3B is a flow chart of an embodiment of a method for initializing the host transaction list upon detection of a failed data operation.

Referring now to FIG. 3B, shown is a flow chart depicting method steps of an embodiment for reinitializing the host transaction list upon detection of a failed data operation. These are method steps that may be performed by the initialize host transaction list process 33a of FIG. 2. Typically, the method steps of FIG. 3B execute continuously on a host computer system to detect a failed data operation by a host in the computer system 10. The mechanism for detecting and signalling an asynchronous event, such as a failed data operation, vary with computer system and are generally known to those skilled in the art. In this embodiment, other processes, such as one executing the method steps of FIG. 3A, may be interrupted when the host transaction list is reinitialized. At step 50 a determination is made as to whether there has been a failed data operation. If so, control proceeds to step 52 where the host transaction list is reinitialized. If there is no failed data operation detected at step 50, the routine waits for a failed data operation, and loops back to step 50.

Figure 4:
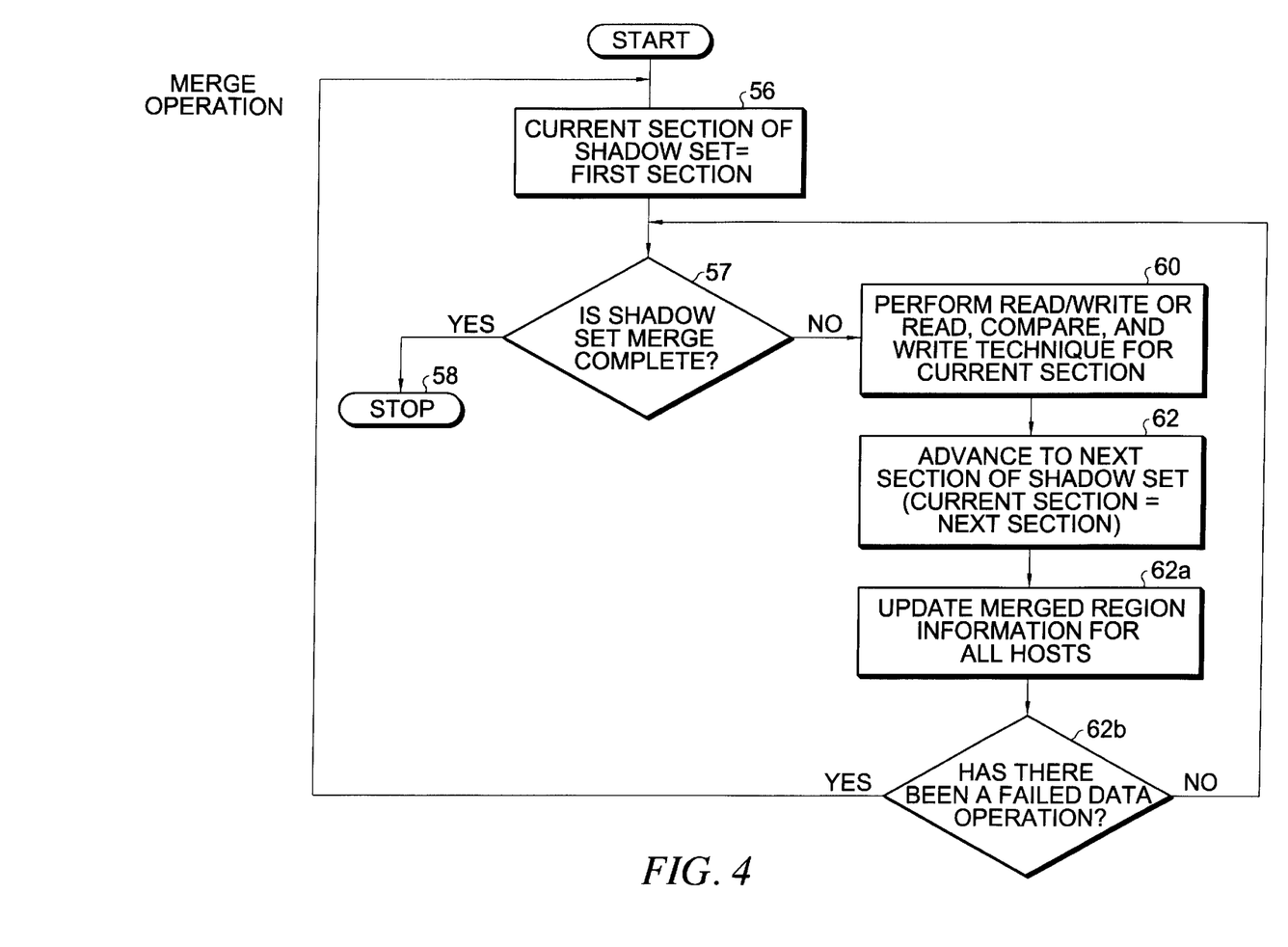
FIG. 4 is a flow chart of an embodiment of a method for performing a merge operation.

Referring now to FIG. 4, a flow chart of an embodiment of a method for performing a merge operation, as performed when executing merge process 32 of FIG. 2, is shown. The merge operation as previously described may be initiated by one of the host computers 12a–12c upon detection of a failed data operation to the shadow set by another host computer within computer system 10. The merge operation is performed on each logical portion or section of the shadow set to establish data consistency among all members of the shadow set.

At step 56 the merge operation begins by making the current section a first section of the shadow set. Control proceeds to step 57 where a determination is made as to whether the shadow set merge is complete for all sections. In other words, the shadow set merge is complete in this particular embodiment when the merge operation for the last logical section of the shadow set has been completed. If a determination is made at step 57 that the merge operation is complete, control proceeds to step 58 where the merge operation is terminated. If a determination is made at step 57 that the shadow set merge operation is not complete, control proceeds to step 60. At step 60 a read/write or a read, compare and write technique is performed using the current section of the shadow set to ensure data consistency between all members of the shadow set for the current section. Details of the read/write and the read, compare, and write technique as performed in step 60 are described in paragraphs below in conjunction with other figures. Control proceeds to step 62 where the current section is advanced to a next section of the shadow set.

At step 62a, the initiating host performing the merge operation communicates updated merge region information to all other hosts. In this embodiment, each host maintains its own copy of the merge region information describing what portion of the shadow set has been merged. The initiating host communicates the information via message passing to other hosts over communication medium 14 since there is no shared memory for interhost communication in this particular embodiment. It should be noted that other embodiments may have other mechanisms for communicating this information with other hosts.

The frequency with which updated merge region information is communicated between the initiating host and other hosts in the computer system also varies with the computer system 10. Generally, this frequency for a particular computer system is tuned to balance the costs of communicating the information with the amount of merging that has occurred. For example, if there is a high communication cost, typically, an embodiment may wait a longer period of time than if the communication cost were lower to allow for additional merge information to be communicated with a single update operation.

Control proceeds to step 62b where a determination is made as to whether there has been a failed data operation. If there has not, control proceeds to step 57 to complete the merge operation. If there has been a failed data operation, the merge process is reinitiated and control proceeds to step 56. Generally, the steps 57–62a are executed until the shadow set merge is complete, or a failed data operation is detected, as in step 62b.

Figure 5:
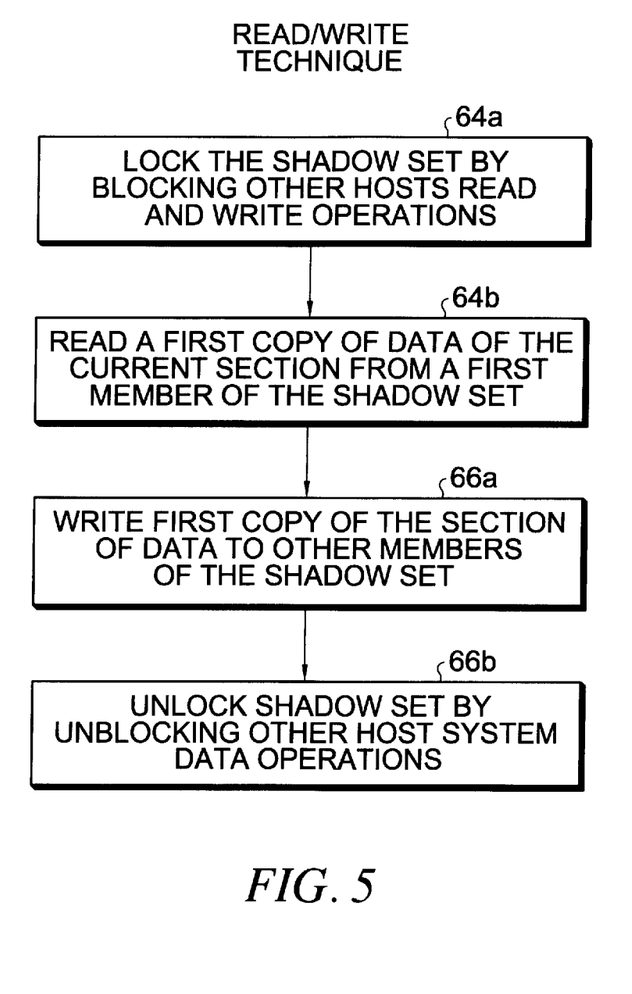
FIG. 5 is a flow chart of an embodiment of a read write technique as used in performing a read operation to a shadow set.

Referring now to FIG. 5, a flow chart of an embodiment of a method for performing the read/write technique, as used at step 60 of FIG. 4, is shown. At step 64a, a shadow set lock operation is performed to block other hosts from performing read and write operations to the shadow set. The implementation of this lock may vary with computer system 10. In this embodiment, messages are communicated between host systems to perform this lock operation. Generally, in a preferred embodiment, the interhost communication mechanism, such as messaging, is expensive. The preferred embodiment seeks to minimize the costs, such as those associated with interhost communication, by using the host transaction list to minimize the amount of required read and write data operations and shadow set locking operations performed to achieve data consistency.

At step 64b a first copy of data of the current section is read from a first member of the shadow set. At step 66a the first copy of the section of data is written to other members of the shadow set insuring data consistency among members of the shadow set. At step 66b, the shadow set is unlocked, as by performing a shadow set unlock operation using message passing. As with the locking mechanism, the unlocking mechanism also may vary with implementation.

Figure 6:
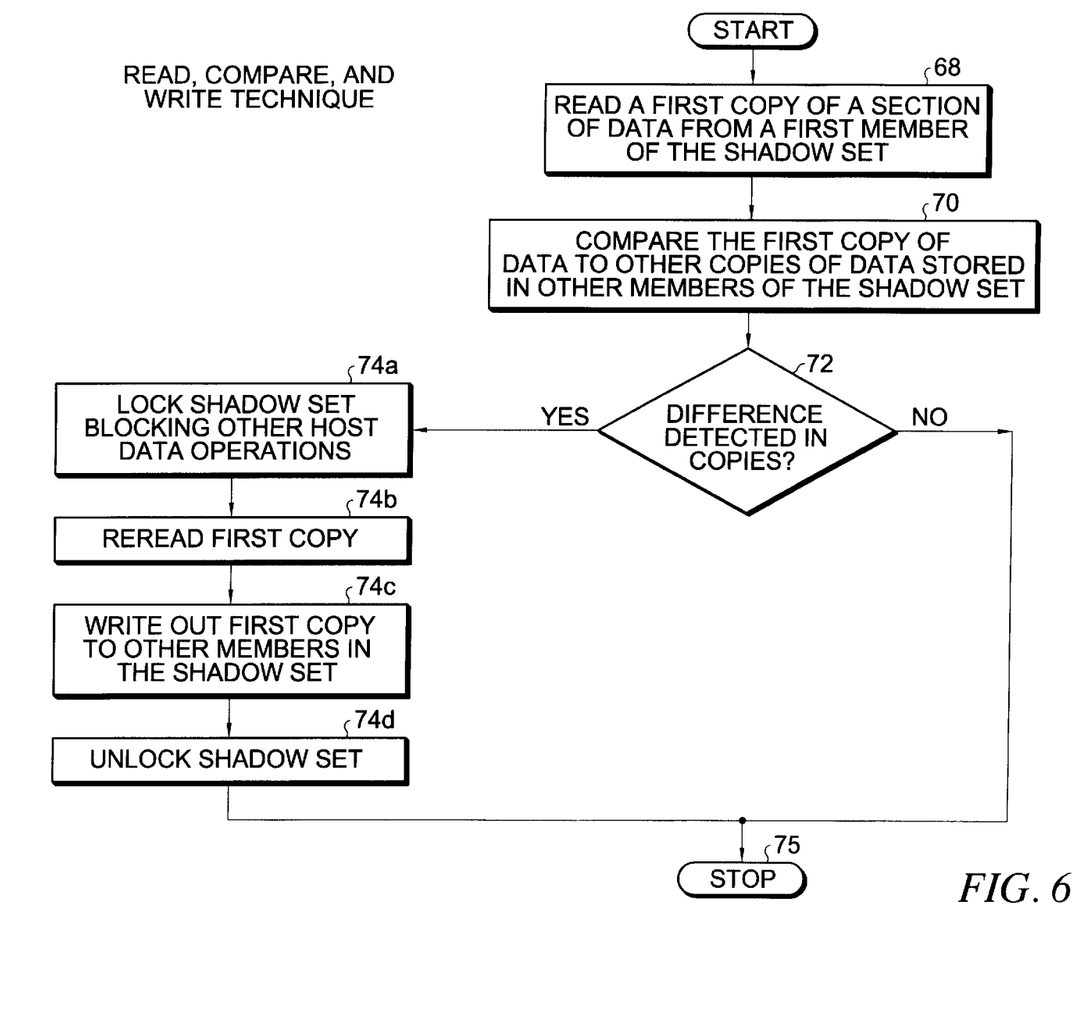
FIG. 6 is a flow chart of an embodiment of a method for performing a read, compare and write technique when reading from a shadow set.

Referring now to FIG. 6, a flow chart of an example embodiment of a method of performing the read, compare, and write technique, as performed in step 60 of FIG. 4, is shown. At step 68 a first copy of a section of data is read from a first member of the shadow set. At step 70 a comparison is made between the first copy of data to other copies of data stored in other members of the shadow set. At step 72 a determination is made as to whether or not there is a difference detected among the copies of data corresponding to the members of the shadow set. In other words, a determination is made at step 72 as to whether there is data inconsistency among members of the shadow set for the current section being examined.

If there is a difference detected, control proceeds to step 74a where a shadow set locking operation is performed similar to the locking operation of step 64a. Control proceeds to step 74b where the first copy of the data is reread. Prior to execution of step 74a in which mutually exclusive access of the shadow set is obtained by a first host, another host may have modified the data stored in the first shadow set member previously read in step 68. Thus, the data is reread in step 74b to ensure that the latest copy of the data is used in subsequent steps. In step 74c, the data, as read in step 74b, is written out to other members of the shadow set. Control proceeds to step 74d where an unlock operation is performed similar to that as in step 66b. Control then proceeds to step 75 where the read, compare and write operation for the current section being read is terminated.

As previously described, the shadow set synchronization operations, such as locking and unlocking operations as performed in steps 74a and 74d, are typically "expensive". The technique of FIG. 6 generally minimizes the amount of costly shadow set synchronization operations by performing them only when a difference has been detected, as in step 72.

Figure 7:
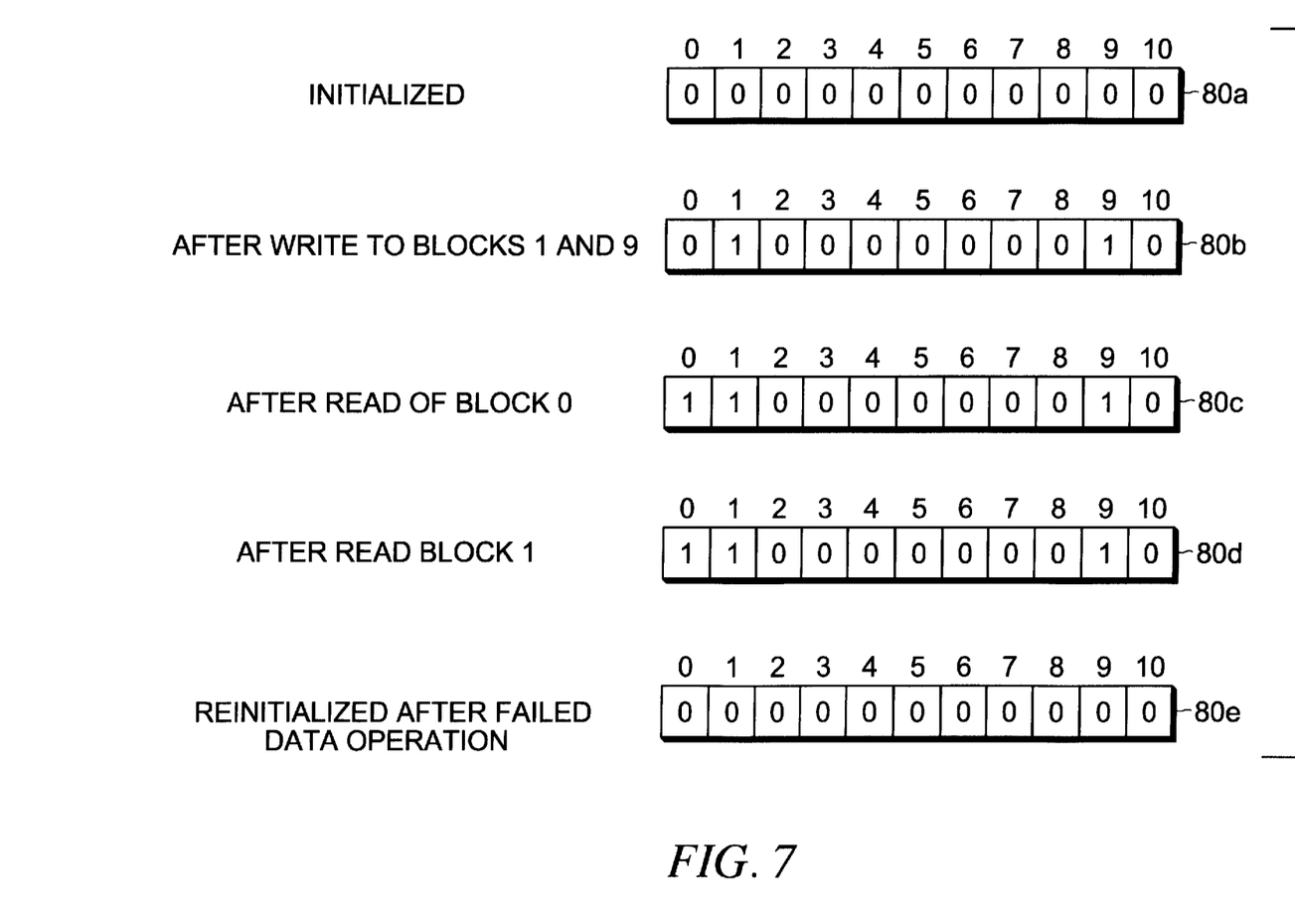
FIG. 7 is a block diagram of an embodiment of a host transaction list as maintained in each host computer of the computer system of FIG. 1.

Referring now to FIG. 7, a block diagram of an embodiment of a host transaction list as maintained in each host computer of the computer system of FIG. 1 is shown. Generally, FIG. 7 includes a snapshot of a bit map at five particular points in processing various consecutive data operations. In this embodiment, the bit map is the data structure used to implement the host transaction list 33 as depicted previously in FIG. 2. Typically, one bit map is designated per shadow set. In this particular embodiment, the bit map corresponds to a shadow set whose members are disks. Each disk consists of 11 blocks, numbered sequentially 0 through 10 in which each block is used for data storage.

Element 80a of FIG. 7 represents an initialized bit map. As a block of data stored on each member of the shadow set is determined to contain consistent data, its bit is set to 1. Accordingly, a bit map entry for a block whose value is 0 indicates that the corresponding data has not yet been determined as consistent in accordance with a previous data operation. The bit map as in 80a of FIG. 7 is initialized, for example, when performing step 52 of FIG. 3 or upon initialization of a shadow set, or upon the failure of a data operation.

Element 80b of FIG. 7 represents the state of the bit map for the shadow set after subsequently doing a write to blocks 1 and 9 of the shadow set. Recall that when a write operation is performed to a member of the shadow set, data is in turn written to all members of the shadow set. Thus upon performing a write operation, it can be concluded that the data is consistent for that particular block or blocks associated with the write operation.

Element 80c of FIG. 7 is a snapshot of a bit map for the shadow set after subsequently performing a read of block 0, in addition to previously performing the write operation to blocks 1 and 9. Note that the bit of bit map 80*b* corresponding to block 0 has the value of 0. After the read of block 0, the corresponding bit in bit map in 80*c* is set to 1. When data is read for a particular block from the shadow set, its corresponding bit in the bit map is read. If the bit value is 1, it indicates that the members of the shadow set have the property of data consistency, and any copy of the data read from any member of the shadow set will return the same value. Alternatively, if the bit value is 0, data consistency among members of the shadow set is not guaranteed based on previous data operations since the last initialization of the bit map.

Reference will now be made back to FIG. 3 to interrelate previously described method steps which use bit map 80*b* when performing the read operation resulting in bit map 80*c*. A determination is made, as in step 42, that the bit value of the bit map 80*b* for the block currently being read, block 0, is not 1. Subsequently, control proceeds to step 46 of FIG. 3. Upon completion of method step 54, bit map 80*c* results.

Element 80*d* of FIG. 7 is a snapshot of the bit map following a subsequent read of block 1 of the shadow set. Note that the bit map 80*d* is equivalent to the bit map of 80*c*. Referring back to FIG. 3 to interrelate previously described method steps to use the bit map 80*c* for a read operation resulting in bit map 80*d*, a determination at step 42 is made that data describing block 1 is in the host transaction list 80*c* and, subsequently, control proceeds to step 44 where data from any member of the shadow set is read. Upon completion of method step 54, bit map 80*d* results. Thus, no state change to the bit map 80*c* is made since block 1 has already been determined as containing consistent data for the shadow set.

Element 80*e* of FIG. 7 is a snapshot of the bit map which is reinitialized after detection of a failed data operation by a host in the computer system 10. Such a reinitialization may occur, for example, upon detection of a failed data operation performing the steps of FIG. 3B.

Functionally, the host transaction list 33 provides a localized advantage to a particular host processor in determining data consistency among members of a shadow set. If each host locally keeps track of what it has read or written since a previous host failure, it can assume that any portion of the shadow set to which it has read or written is consistent since the last failed data operation to the shadow set.

As previously described, each host in the computer system maintains a local host transaction list for those data operations which each particular host has completed. Generally, one reason for each host locally maintaining a list is based upon the principle that disk accesses are typically localized for a particular process executing in a host, such as 12*a*. In other words, a computer program executing in a host 12*a* typically tends to refer to a particular set of data for performing various data operations at a particular point in time of processing. Thus, the host transaction list maintained on another host system, such as 12*b* or 12*c*, is not generally relevant to the data accessed by the computer program executing in host 12*a*.

An advantage of using a host transaction list is demonstrated in the method steps of FIG. 3, when performing a data operation with a shadow set, in which the host transaction list is used in conjunction with the merged region to verify a portion of the shadow set as containing consistent data. In other words, use of the host transaction list provides an advantage by more efficiently determining data consistency among a shadow set when performing a data operation, such as a read, by recording and using additional information about various data operations.

In one preferred embodiment, the host transaction list for each host in the computer system is maintained until the merge operation completes. Upon the merge operation completing, use of the host transaction list is no longer necessary because completion of the merge operation implies that the data consistency of the shadow set has been restored. Upon a host once again failing to complete a data operation, use of the host transaction list may be resumed.

It should be noted that in the foregoing embodiment, a bit map is the data structure used as the implementation of the host transaction list. As known to those skilled in the art, other data structures may be used which may prove to be more efficient for a particular system or application being executed within the computer system. It should also be noted that the foregoing embodiment in the computer system, each host maintains its own host transaction list. However, for a particular computer system or a particular application executing in the computer system, sharing information between one or more hosts, such as 12*a* through 12*c* in the computer system of FIG. 1, may be desirable for a particular application executing in the computer system.

In a preferred embodiment, the computer system generally should be "tuned" to determine how much of the system resources, such as memory, computer time, and task priority, are accordingly allocated to performing data operations and executing the merge process 32. For example, the merge process 32 in a particular computer system may execute with a lower priority than data operations such as performed by the data access operation process 34. The merge process 32 may execute as a "background task", for example, at a low priority such that system performance and efficiency is not degraded.

In the previously described embodiment, the host transaction list for each host in the computer 10 of FIG. 1 is maintained by recording data about various data operations in each list. Additionally, a merge process is executed to produce a resulting merged region. The merged region and the host transaction lists are used to determine data consistency for a particular block for which a data operation is being performed.

Additionally, an alternate embodiment incorporating the principles of the invention may not perform a merge operation, as determined in accordance with the particular computer system and applications being executed within the computer system. In other words, a merge process 32, as shown in FIG. 2, may not execute within the computer system. Rather, in determining whether data consistency exists among members of the shadow set, the host transaction lists are solely used. Such a preferred embodiment may be used, for example, when there is frequent locality of reference of data for each host computer system, and when there is a relatively high failure rate for each particular host, or a collectively high failure rate associated with a large number of hosts accessing the shadow set.

The foregoing description affords a flexible and efficient technique for performing subsequent data operations in a computer system in which a previous failed data operation has occurred. Additionally, the technique provides for simultaneously determining data consistency among members of a shadow set. The foregoing technique can easily be varied in accordance with a particular computer system or a computer system executing a particular application.

Having described preferred embodiments of the invention, it will now become apparent to those of skill in the art that other embodiments incorporating its concepts may be provided. It is felt, therefore, that this invention should not be limited to the disclosed embodiments, but rather should be limited only by the scope of the appended claims.

What is claimed is:

1. A method of accessing data in a computer system from a shadow set after a failed data operation, the method comprising the steps of:

detecting said failed data operation in the computer system;

maintaining a host transaction list by recording data operations in said host transaction list indicating that, upon completion of each of said data operations, a storage area of the shadow set associated with each of said data operations contains only consistent data; and performing another data operation subsequent to the failed data operation and determining directly from an entry in said host transaction list whether a storage area associated with said another data operation contains consistent data, wherein said determining is accomplished without performing a read operation on a member of the shadow set.

2. The method of claim 1 further including the step of:

performing a merge operation to reestablish data consistency for the shadow set, said merge operation producing a merged region including portions of the shadow set containing consistent data; and wherein said step of performing another data operation uses said merged region to determine if a storage area associated with the other data operation contains consistent data.

3. The method of claim 1, wherein the computer system includes a plurality of host processors, and said step of maintaining a transaction list is performed for each of said plurality of host processors.

4. The method of claim 1 further including the step of:

reinitializing said host transaction list in response to detecting a failed data operation.

5. The method of claim 2, wherein said shadow set includes a plurality of members, and said step of performing another data operation includes the steps of:

determining a type of data operation of the other data operation;

upon determining that the type is a read data operation, performing the steps of:

searching said host transaction list to determine if an entry of said host transaction list is associated with a location which matches a location associated with the read operation; and upon determining that said host transaction list includes the entry having a matching location, performing the read operation by reading data from any member of the shadow set.

6. The method of claim 5, wherein, upon determining that the type is a read data operation and that said host transaction list does not include an entry having a matching location, the method further includes performing the steps of:

determining if the location associated with the read operation is within said merged region;

upon determining that the location is within said merged region, performing the read operation by reading data from any member of the shadow set;

upon determining that the location is not within said merged region, performing a data consistency technique to ensure that data included in the location is consistent upon completion of the read operation.

7. The method of claim 6, wherein said step of performing a data consistency technique includes performing a read and write technique which includes performing the steps of:

reading data from one member of the shadow set; and writing out the data to other members of the shadow set.

8. The method of claim 6, wherein said step of performing a data consistency techniques includes performing a read, compare, and write technique which includes performing the steps of:

reading first data from one member of the shadow, set;

determining if the first data for the read operation is consistent with other data by comparing the first data read from one member of the shadow set to the other data stored at other members of the shadow set; and upon determining that there is a data inconsistency, writing the first data to other members of the shadow set.

9. The method of claim 2, wherein the step of performing a merge operation includes the steps of:

performing a data consistency technique for each portion of storage of the shadow set.

10. The method of claim 9, wherein said step of performing a data consistency technique includes the step of performing a read and write technique, said step of performing said read and write techniques including the steps of:

reading data from one member of the shadow set; and writing out the data to other members of the shadow set.

11. The method of claim 9, wherein said step of performing a data consistency technique includes the step of performing a read, compare, and write technique, said step of performing said read, compare and write technique including the steps of:

reading first data from one member of the shadow set;

determining if the first data for the read operation is consistent by comparing the first data read from one member of the shadow set to other data stored at other members of the shadow set; and upon determining that there is a data inconsistency, writing the first data to other members of the shadow set.

12. The method of claim 2 wherein said computer system includes a plurality of host computers, the merge operation is executed in a first of said plurality of host computers, and a second of said plurality of host computers failed to complete the failed data operation.

13. The method of claim 1, wherein said host transaction list is a bit map.

* * * * *